UNITED STATES PATENT OFFICE.

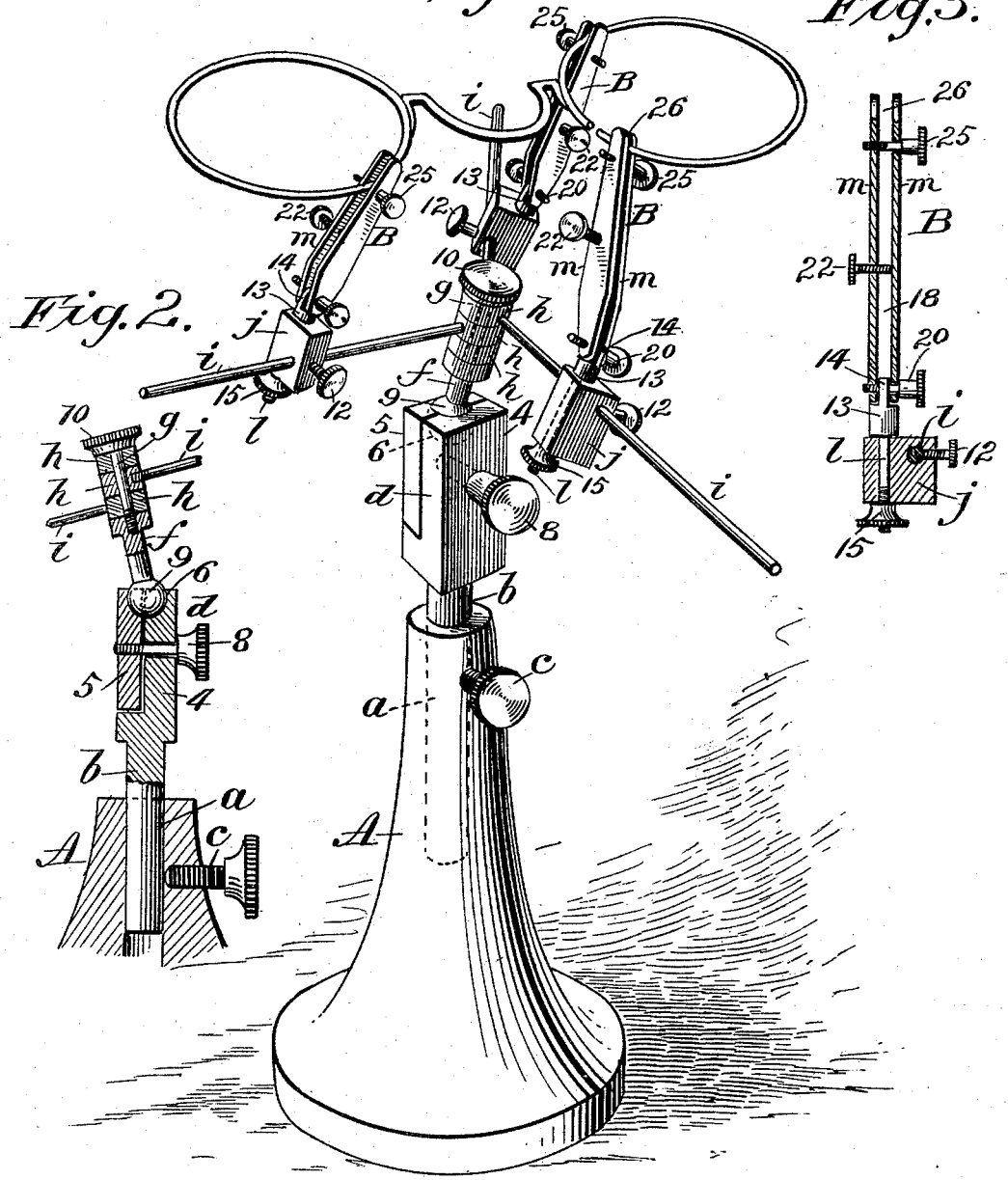

WALLIACE B. FISH, OF SPRINGFIELD, MASSACHUSETTS, ASSIGNOR TO O. W. BULLOCK & CO., OF SAME PLACE.

JEWELER'S WORK-CLAMP.

SPECIFICATION forming part of Letters Patent No. 456,891, dated July 28, 1891.

Application filed April 14, 1891. Serial No. 388,838. (No model.)

*To all whom it may concern:*

Be it known that I, WALLIACE B. FISH, a citizen of the United States, residing at Springfield, in the county of Hampden and State of Massachusetts, have invented new and useful Improvements in Work-Clamping Devices for Jewelers, of which the following is a specification.

This invention relates to improvements in a class of work-clamping devices utilized by jewelers and others in the making and repairing of small articles—such as eyeglass or spectacle frames, chains, and the like—the object of the invention being the production of a device or apparatus, which, while of extremely simple and inexpensive construction, is capable of utility for a large variety of work, the different parts or members being adapted to occupy an infinite number of different positions, the one relative to the other.

The invention consists in the combination and arrangement of parts, and the construction of certain of the parts, all substantially as will hereinafter more fully appear, and be set forth in the claims.

The improvements are illustrated in the accompanying drawings, in which—

Figure 1 is a perspective view of a work-clamping device, the same being shown as in use for holding a spectacles-frame. Fig. 2 is a sectional view taken vertically through the stand and parts of the device next thereto. Fig. 3 is a sectional view of one of the rods comprised in the device, the slide-block thereon, and one of the work-clamping arms.

In the drawings, A represents a stand or upright axially socketed vertically, as at $a$, receiving therein the post $b$, which is confined in its vertical adjustment by the set-screw $c$. The said post is provided at its upper end with a head or block which is split or formed in two members 4 5, having formed in the upper end thereof the socket 6, comprising the greater portion of a sphere. The members of the two-part block are clamped together and the socket is contracted by the clamping-screw 8.

$f$ indicates a stud having at its lower end the ball-like head 9, which is entered for engagement within the socket.

$g$ represents a screw having an enlarged head 10, the shank of the screw, as shown, being comparatively long, and the same by its threaded extremity axially enters with a screw engagement the said stud $f$, which is bored and tapped therefor.

$h\,h$ represent collars, three in number being here shown, the same loosely surrounding the shank of the screw $g$, and when the screw is loosened said collars are free for a rotary movement thereon; but when the said screw is turned up the collars are firmly clamped against any movement between the head of the screw and the upper end of the said stud $f$. Each collar is provided with a radial rod $i$ of a suitable length, substantially as shown. The rods, being carried on collars which are at different heights, are free to rotate more or less without interference the one with the other, so that they may have any radial arrangement desired.

$j$ indicates a slide-block horizontally perforated, whereby it encircles the radial rod $i$, a block being provided for each rod. Each block may move longitudinally on the rod carrying it, and may have a swiveling motion thereon, and may be locked against any motion by the set-screw 12.

$l$ represents a spindle which passes through the block $j$ at one side of the line of passage of the rod $i$ and at right angles thereto, one of said spindles being provided for each of said blocks. The said spindle, at its upper end, is formed with the enlargement 13, having the tongue 14, the other end of the spindle projecting through and beyond the under face of said block, and, being screw-threaded, receives thereon the locking-nut 15.

B B B represent the clamping-arms, each, as clearly shown in the drawings, consisting of two flat members or strips $m\,m$, separately formed, but arranged side by side in parallelism, with a suitable space, as shown at 18, between them, and by their inner ends pivotally connected upon the tongue 14, formed as the extremity of the spindle $l$, by the set-screw 20. Said screw, under its head, is shouldered and passes loosely through one of the said members $m$, the tongue 14, and with a screw engagement through the other member $m$. A screw 22 passes through one of the said members $m$ at or near its middle and abuts by its end against the inner surface of the other member. A screw 25 passes through both members of the clamping-arm at a short distance within the outer end thereof. As shown in Fig. 3, the screw is shouldered under its head and passes loosely through the member *m* which is nearest to the head, but with a screw engagement through the other member. By properly adjusting the stud *f* at its ball-and-socket connection with the parts supporting same, the stud may be swung into an oblique position, extending upwardly and sidewise in either direction, and the radial rods, while capable of being swung nearer to or farther from each other, may be maintained substantially in a horizontal or any oblique plane; and without particular description it will be plain that the clamping-arms may be supported at any distance within the range of the instrument from the axis of the stud *f*, and may be held in practically any line parallel with or at any angle to either the axis of the stud *f* or the stand A or either of the radial rods *i*.

The space 26 between the members of the clamp-arm B, which is outside of the screw 25, is that within which the part to be clamped is usually entered, and such space may be of greater or lesser width, according as the screw 25 is turned.

The principal function of the screw 22 is to constitute a rigid point on one of the arms, from which the portion of such arm outside of said point is deflected as the screw 25 is operated, so that the manipulation of said screw will have no effect upon the joint between the clamp members *m m* and the tongue 14, carried on the end of spindle *l*.

What I claim as my invention is—

1. In a work-clamping device for jewelers, a support and a stud having two or more arms thereon, each provided with an adjustable clamping-arm, and said stud connected to the support by a ball-and-socket joint, and a locking device for the joint, for the purpose set forth.

2. In a work-clamping device for jewelers, a stand or upright supporting the two-membered block *d*, with the socket and clamping-screw, combined with the ball-provided stud supporting the radial rods *i* and each having a clamping-arm adjustable thereon, for the purpose set forth.

3. In a work-clamping device for jewelers, a stand or upright, the stud vertically adjustable and also adjustable about the axis of the upright and having the radial rods adjustably mounted thereon to swing around the axis of the said stud, and each rod having a clamping-arm thereon which is bodily movable on the rod toward and away from the rod-carrying stud, and each clamping-arm having a movement around the axis of its rod and also an independent swinging movement, substantially as described.

4. In a work-clamping device for jewelers, a stud or support and one or more rods extended angularly therefrom, combined with a block adjustably connected to slide along the rod and to have a rotary movement thereon, a spindle having a bearing on said block for rotation in a line angular to the said rod, and a clamping-arm pivotally mounted on said spindle, and set-screws for holding the said several parts in their adjusted positions, for the purpose set forth.

5. In a work-clamping device for the purpose set forth, the combination, with a stand or upright and a stud having a connection for vertical adjustment on the said standard, of a series of collars axially supported relative to the said stud, and a set-screw for holding said collars against rotational movement and each collar provided with an outwardly-extended rod having a clamping-arm adjustably mounted thereupon, substantially as and for the purpose set forth.

6. In a work-clamping device for the purpose set forth, a clamping-arm and a support therefor, the said clamping-arm consisting of the two separate and parallel members *m m*, connected and adapted to be bound in place by their inner ends upon said support by the set-screw which is provided therefor, as described, the set-screw 22, screwing intermediately through one of said members *m* and bearing upon the inner side of the other, and the clamping-screw 25, engaging the outer extremities of said members, substantially as shown, and for the purpose set forth.

WALLIACE B. FISH.

Witnesses:
H. A. CHAPIN,
WM. S. BELLOWS.